United States Patent [19]
Ruel et al.

[11] Patent Number: 5,361,298
[45] Date of Patent: Nov. 1, 1994

[54] TELECOMMUNICATIONS SERVICE PROVISION EQUIPMENT TRANSFER

[75] Inventors: Bernard G. Ruel; Gilbert M. Stewart, both of Naperville; Aruna Thirunagari, Warrenville; James L. Turner, Lemont, all of Ill.

[73] Assignee: AT&T Bell Laboratories, Murray Hill, N.J.

[21] Appl. No.: 210,096

[22] Filed: Mar. 16, 1994

Related U.S. Application Data

[63] Continuation of Ser. No. 829,783, Jan. 31, 1992, abandoned.

[51] Int. Cl.$^5$ .............................................. H04M 7/12
[52] U.S. Cl. ...................................... 379/242; 379/89; 379/243
[58] Field of Search ................ 379/89, 242, 243, 244, 379/245

[56] References Cited

U.S. PATENT DOCUMENTS

| | | | |
|---|---|---|---|
| 4,224,477 | 9/1980 | Perkinson | 379/245 |
| 4,755,985 | 7/1988 | Jayapalan | 379/245 |
| 4,769,834 | 9/1988 | Billinger | 379/245 |
| 4,933,967 | 6/1990 | Lo | 379/245 |
| 4,959,856 | 9/1990 | Bischoff | 379/245 |

OTHER PUBLICATIONS

ISDN Voice Features, AT&T 235-190-105 Feature Document, Sep. 1990, pp. 5.5-1-5.5-30.
Line Time Slot Bridging, AT&T 235-190-102 Feature Document, May 1991, pp. 16-1-16-14.
710 Modular Splicing System, AT&T 2917B-NDV Brochure, 1989.
Cable Transfers Should Be This Easy!!!, Remote Switch System, Inc. Brochure, pp. 1-21.

*Primary Examiner*—James L. Dwyer
*Assistant Examiner*—Michael N. Lau
*Attorney, Agent, or Firm*—Werner Ulrich

[57] ABSTRACT

This invention relates to arrangements for simplifying the transfer of a source of telecommunications signals, such as a telecommunications customer line or telecommunications trunk, from a first port of a switching system to a second port of that same switching system. Such a transfer requires a transfer of a connection in the outside plant, usually in a manhole, and establishment of a connection from the outside plant to the second port, usually in a distributing frame of the switching system. Translation data is stored for the second port to indicate availability of the second port for assignment to a customer, and, in one embodiment of the invention, to identify the customer to be connected to that second port. In accordance with that embodiment of the invention, the customer line to the first port is tested in the manhole to verify the identity of that customer; the line to the second port is tested to see if the translation data for that second port comprises the same customer identification. If so, a request to assign the translation data for that customer to the second port is then transmitted from the manhole. In response to an acknowledgment that the translation data has been so assigned, the customer's line is transferred to the second port. Advantageously, the translation data can be stored and a connection to the second port can be established ahead of time in the switching system, and the transfer of the line can be carried out by one individual in the manhole without requiring the cooperation of other craft in the switching system.

26 Claims, 4 Drawing Sheets

TELECOMMUNICATIONS SERVICE PROVISION EQUIPMENT TRANSFER

This application is a continuation of application Ser. No. 07/829,783, filed on Jan. 31, 1992 now abandoned.

TECHNICAL FIELD

This invention relates to arrangements for transferring telecommunications customer lines or thinks from assignment to a first port of a switching system to assignment to a second port of such a system.

PROBLEM

A problem which is encountered in carrying out day to day operations for local telephone companies is that of transferring customers from one means for transmitting telecommunications signals, such as cable pairs, to another. Such transfers, of which cable transfers are a typical example, are required because additional customers and additional equipment are added to a central office switching system, and it is necessary to associate existing customers with such new equipment. Another reason for performing a transfer is to make available to existing customers a new feature which is associated with new equipment connected to the new cable. Typically the new equipment is terminated in a new cable and customers previously connected to other cables must be shifted to this new cable. Such a shift, which may be performed at some distance from a local telecommunications switching system, must be coordinated with a corresponding shift in the switching system. This is required to ensure that data, called translation data, for a customer who has been transferred to the new cable is now associated with the equipment of the central office that is associated with the new cable.

Such a cable transfer involves a number of problems. The translation data for the customers being moved must be associated with the new equipment, a change in the switching system must be made, typically on a main distributing frame, to connect the new cable to the new equipment, and a change must be made in a distributing point in the manhole to reconnect customers from a pair in an old cable to a pair in a new cable. In order to perform these actions, it is necessary to coordinate the efforts of the people entering the translation data, the people making changes in the main distributing frame, and the people making changes in the manhole. At present, this is done by keeping these people in telephone contact with each other, and it is required that translation changes and the port transfer be performed at approximately the same time, a costly procedure. Such an arrangement is very inefficient because little advance work can be performed on one of the three tasks because of the necessity of coordinating with the others. A further complication arises from the fact that the telephones being transferred from the old cable to the new cable are working telephones which may be in the process of making a call, in which case, the transfer must be deferred. The transfer must be made quickly in order to ensure that the period of time that telephone service is unavailable to the customer being transferred is minimized.

An arrangement currently available for helping to solve this problem is called the "line time slot bridging feature". During the several hours required to complete a cable transfer, the directory number for each of the lines being transferred is assigned to a line in both the old cable to which the customer is presently connected and in the new cable to which the customer is to be switched. When the customer makes an outgoing call over either the old or the new cable, the call is set up in the conventional way. When an incoming call is received, a ringing connection is set up to both of the equipments, called ports, connected to the old and the new cable; after the active customer's telephone answers one of these ringing connections the other connection is dropped. Eventually, after the cable transfer has been made, the customer is restored to a normal translation associated now with the equipment for the new cable and the translation data for that customer for the old cable is eliminated. This process is expensive in its use of customer data resources. Further, the line time slot bridging feature cannot be applied to lines in the multiline hunting group and to lines which have certain popular customer features. For example, line time slot bridging cannot be used for customers having local area signaling services (LASS) features which are used for such purposes as automatic re-dial, automatic call back and caller identification. Further, in order to accommodate new features, the software for controlling the line time slot bridging feature must be expanded as these new features are introduced.

Another arrangement which has been used primarily for customers with complex features such as Integrated Services Digital Network (ISDN) service is automatic station rearrangement which permits a customer to move his telephone from one port to another port in the same central office. This arrangement is very expensive in translation data memory because all customers who may be moved require a substantial block of translation data to accommodate this feature. Further, the feature has the disadvantage, for the purpose of making a cable transfer, of being limited to moves among a previously assigned restricted group of ports and therefore is impractical for use with respect to a general procedure for reassigning customers to a new cable and a newly assignable set of ports.

SOLUTION

The above problems are solved and an advancement is made over the prior art in accordance with our invention wherein in order to transfer service for a customer from an old, first port, to a new, second port, translations for the second port to which a customer is assignable are modified to indicate assignability and, optionally, to include an identification of the customer such as a directory number: the translations are further optionally modified to include either the identification of the first port in the second port translations or the identification of the second port in the first port translations; craftsman or craftswoman ("craft") at the main distributing frame connect the new cable pair to the second port; craft at a connection transfer point, such as a manhole, then query what is believed to be the cable pair connected to the first port in order to receive an identification of the customer, such as a directory number, and query the cable pair connected to the second port to obtain an indication of availability and, optionally, the identification of the customer to be moved to the second port. If the identification of the customer at the first port is correct, and the second port has responded with an availability indication and, optionally, the same identification of the customer, then the customer's line is moved to the cable pair connected to the second port and the craft signals to the office to reassign the translation data originally assigned to the first port to the second port. Advantageously, this arrangement for performing cable transfers can be performed by craft in the connection point (manhole) without requiring coordination with other craft at the central office.

In accordance with one aspect of the invention, a pool of ports available for assignment has its translations changed to reflect this availability. In this case, the craft performs the transfer of the cable pair if the pair connected to the first port responded with the proper customer identification and the cable pair connected to the second port respond with availability. Advantageously, such an arrangement does not require that customers be preassigned to the ports connected to the new cable.

In accordance with one specific embodiment, the translations originally stored for the second port contain the identity of the first port; the request to reassign the translations is sent as a special access code over the cable pair to the second port, whose translations provide the office with the information needed to move translations from the first port to the second port. Alternatively, the reassign translations request can be made by dialing an access code over the cable pair to the first port if the first port translations have been augmented with the identity of the second port. In case a pooling arrangement is used, an access code dialed over the line connected to the second port is augmented with data received from the first port identifying the first port, or, if the access code is dialed over the wires connected to the first port, the access code is augmented with data received from the second port identifying the second port.

In accordance with another aspect of the invention, an acknowledgment signal is returned from the central office after the translation data has been reassigned to the second port. In one specific embodiment of the invention, this signal is a ring back signal receivable from either the first port or the second port. Advantageously, if the signal is receivable from the first port, the signal will not disturb the customer since the customer is no longer connected to the first port.

Advantageously, the method of this invention is applied to perform cable transfers in three phases each of which requires no coordination with the other. In the first phase, the translation information, discussed above, preparatory to making the cable transfer is entered into the switching system. The automatic entry of such translation data is well known in the prior art and is performed by systems such as Remote Memory Administration System (RMAS). In the second phase, which may be carried out independently of the first phase, but which, like the first phase, must be carried out prior to the third phase, the new cable is connected to a set of ports of the switching system, typically through wire jumpers in a main distributing frame. The third phase is performed by craft, such as a splicer, in the connection point (manhole). If, through some misunderstanding, the first two phases have not been completed, the craft is simply unable to perform the third phase until the first two have been completed, but is presented with the information necessary to prevent a mistake.

This invention can be used for purposes other than cable transfer. For example, a customer may be served from a subscriber loop carder and may be assigned to a new port at the switching system. The queries, jumper changes and request to reassign translation data may then be made by craft working at a main distributing frame, or at a distributing frame in a satellite office. The port may be assigned to a channel of a multiplexed carder system, or to a logical (virtual) channel of a packet switched facility. In each case, a query is made at a physical point associated with a customer prior to requesting the reassignment of translation data.

DETAILED DESCRIPTION

Figure 1:
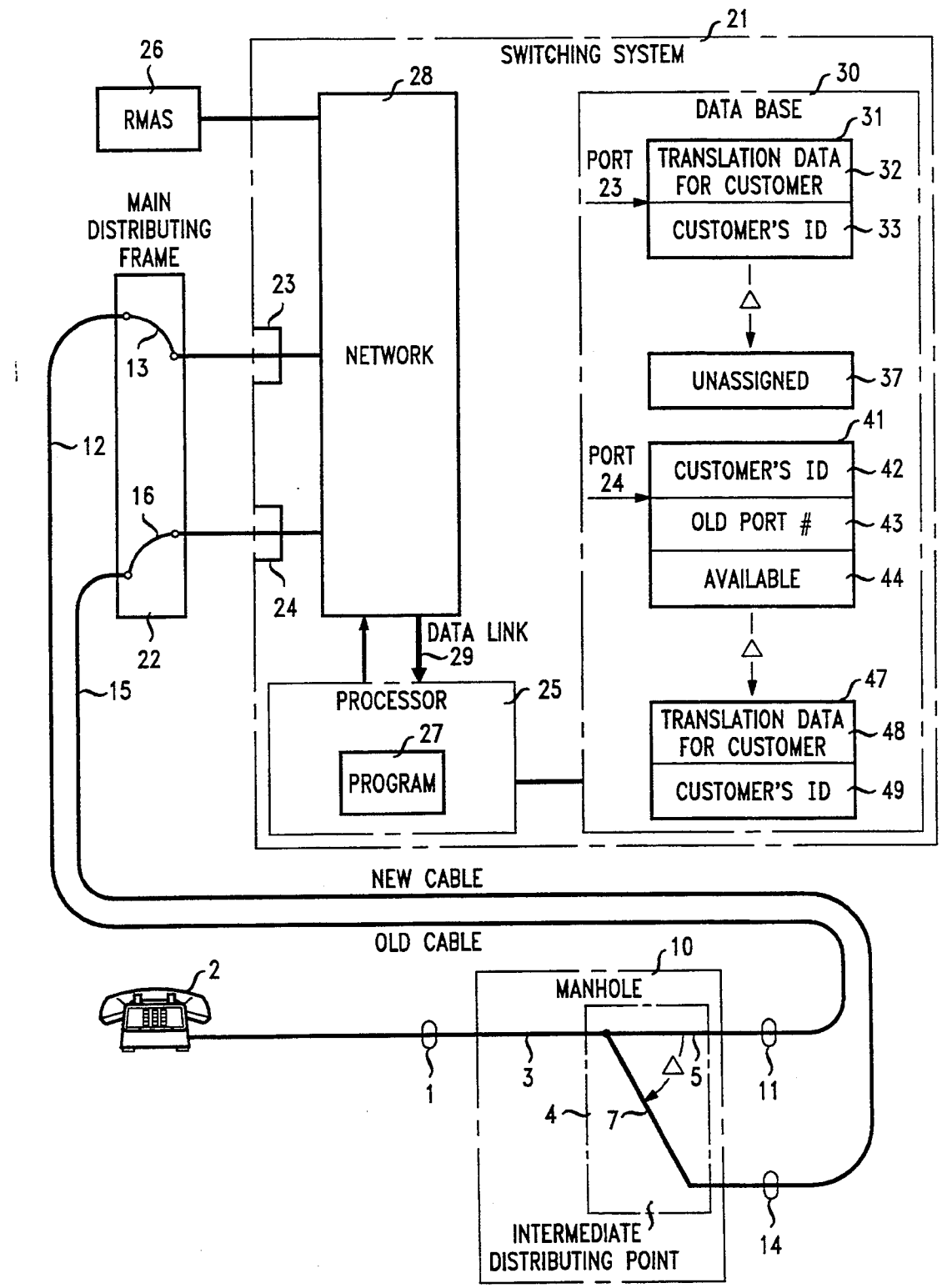
FIGS. 1 and 3 are block diagrams of a preferred implementation of applicants' invention.

FIG. 1 is a block diagram of a preferred implementation of applicants' invention. A cable connection presently exists in manhole 10 between cable pair 3 in cable 1, connected to customer 2, and cable pair 12 in cable 11. The connection 5 is made at an intermediate distributing point 4, typically in a manhole 10. After the cable transfer has been completed, cable pair 3 will be connected via connection 7 to cable pair 15 in new cable 14. Cable pair 12 is connected via jumper 13 in main distributing frame 22 to port 23 (the first port) in switching system 21 and cable pair 15 is connected through jumper 16 to port 24 (the second port). The switching system includes switching network 28 connected to ports 23 and 24 and to all the other ports which the switching system interconnects. The network is controlled by a processor 25 controlled by a program 27, which processor also controls data base 30. Data base 30 is used for storing translation data for various customers and ports of the switching system. Switching system 21 is also connected to an operations support system, such as RMAS (Remote Memory Administration System), which communicates with a system for administration of main flames. RMAS is described in "Remote Memory Administration System—System Description," published by AT&T (Order number OPD-5P680-01). In recent years, proprietary systems such as COSMOS (Computer System for Main Frame Operations) available from Bellcore have been made available for automating the assignment of cable pairs to switching system ports and customers, thus replacing the manual main frame administration systems and procedures. The operation of COSMOS is not required for use of this invention. RMAS communicate with processor 25 via network 28 and data link 29.

Prior to the cable transfer, the translations 31 for the customer connected to port 23 include block 32 which has the bulk of the translations for that customer, and a customer identification 33. The customer identification is usually a directory number but for cases such as multi-line hunting groups the identification may include special identification since one directory number may be used for many ports. In accordance with the principles of this invention, a special set of translations 41 is stored for port 24 prior to making the cable transfer. In the preferred embodiment, this special set of translations includes a customer identification 42 and the identification of the first port, i.e., port 23 (43) and an indication of availability for assignment (44). Following the accomplishment of the cable transfer, the translations for port 23 are changed to unassigned (block 37) and the translation (block 47) for port 24 now include the full translation data 48 for the customer as well as the customer's identification 49.

Figure 2:
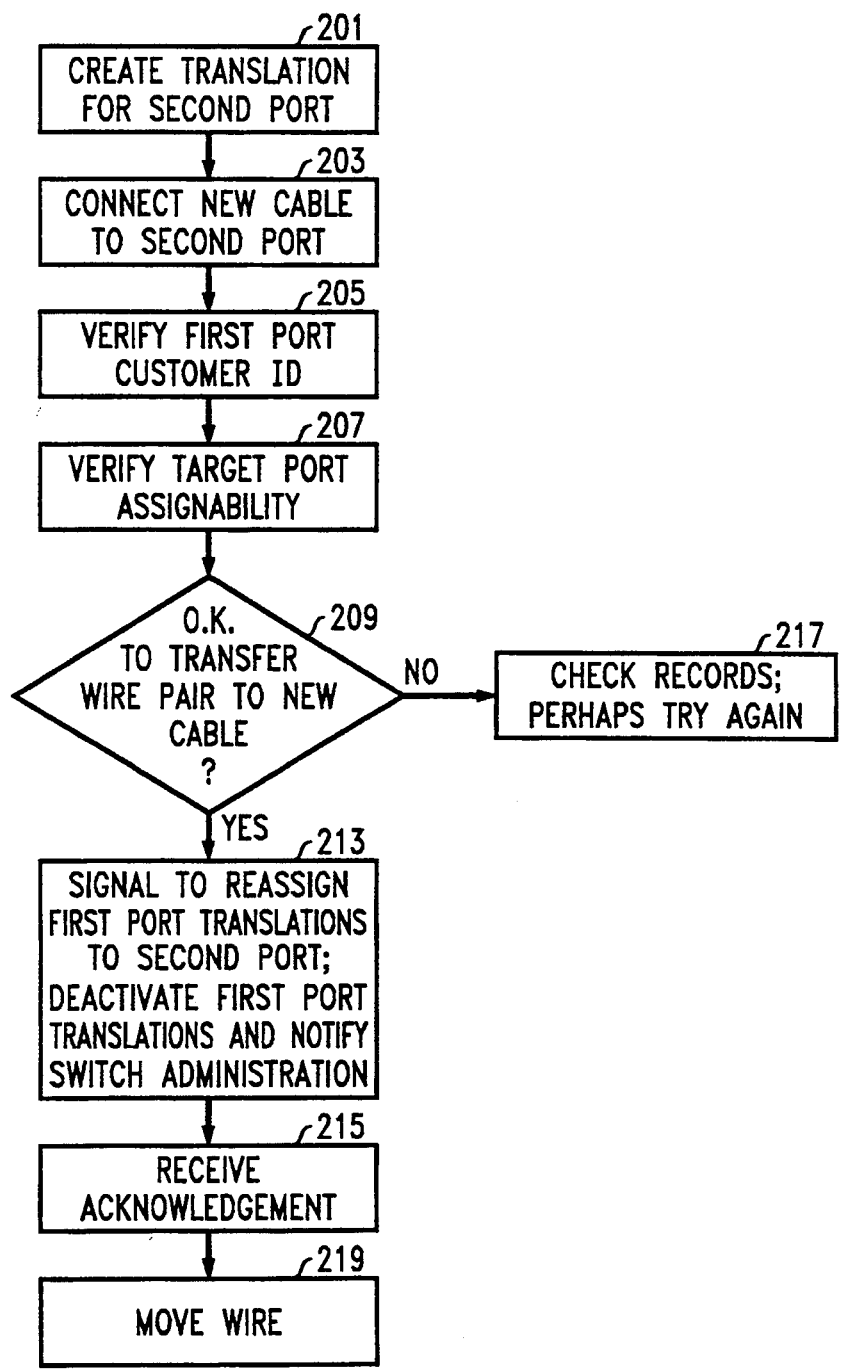
FIG. 2 is a flow diagram of steps performed in transferring a customer line from a first port of a switching system to a second port of that system.

FIG. 2 illustrates the steps of the method for performing a cable transfer. Initially, the new translation data, i.e., block 41, FIG. 1, must be created (action block 201). In modern systems, this step is performed by the processor 25 using data from an operation support system such as RMAS (block 26, FIG. 1) available from AT&T Network Systems. These translations in the preferred implementation include an indication of availability for assignment, the identity of the customer to be assigned to each of the second ports and the identity of the first port to which this customer was previously assigned. The new cable is connected to the second ports usually through a main distributing frame (action block 203). This action is performed under the control of craft at the central office. The rest of the steps of the method of FIG. 2 are performed under the control of craft in the manhole who is performing the final steps of the cable transfer. While steps 201 and 203 may be performed in an arbitrary order, both must be performed before step 205 in order that steps 205, 207, 209, 213, 215, and 219 may be executed successfully.

In step 205, the craft at the manhole verifies that the original port customer identification corresponds to the records. He/she does so by dialing a special access code which results in receiving an announcement of the customer's identification (usually the directory number). In alternative embodiments, the signal from the switching system can be used to control a display for the craft. The craft then verifies the availability for assignment, and, in the preferred embodiment, the customer identification of the target or second port by connecting to that second port and dialing a special access code for requesting the identification (step 207). Test 209 is performed by the craft and is a general test to check whether it is okay to transfer the customer's wire pair from the old to the new cable. In the preferred implementation, this test is simply a check made by the craft that the two customer identifications match.

If test 209 is unsuccessful (block 217), a mistake has been made either in the records or in accessing a specific cable pair; in the latter case, the craft repeats steps 205, 207 and 209.

If test 209 is successful, the craft then signals the switching system to reassign the first port translations to the second port and to deactivate the first port translations (action block 213). The switch administration, which may be automated by a system, such as COSMOS, or which may be handled manually, is notified of the translation reassignment. In the preferred implementation, this signal is the dialing of a special access code over the wire pair in the new cable. Because the original translation data for the second port included the identification of the first port, the switching system has sufficient data to perform the translation reassignment function.

In an alternative embodiment, the translation for the first port are enhanced initially to include the identification of the second port and the reassign translation request access code is dialed by the craft over the cable pair to the first port.

Finally, to report that the translations are being reassigned and that the customer is now able to receive service at the second port, the switching system transmits an acknowledgment to the craft in the manhole. This acknowledgment may be in the form of a ring back over the wire pair in the new cable. After the acknowledgment has been received, the craft moves the wire (step 219) to connect the customer to the new cable pair, thence, to the second port.

The movement of the wire could also precede the request for the translation reassignment, or precede the acknowledgment. However, the safest course is to move the wire after receiving the acknowledgment, because all other steps have been shown to be successful. By deferring the wire movement to follow the acknowledgment, customer down time resulting from a slow translation reassignment is minimized.

In an alternative embodiment, the translations for the second port simply indicate the availability of a second port for assignment and the test by the craft is simply to check whether the port attached to the pair of wires being tested in the new cable is available for assignment. Using this arrangement, the request to move translations is somewhat more complicated since it is necessary to identify the second port in the translation reassignment request if sent over the first port, or to identify the first port or to transmit the customer identification if the request is sent over the pair of wires to the second port. The advantage of the alternative embodiment is that the second port need not be assigned to a specific customer by the original set up process for the translations for the second ports.

More generally, this arrangement can be used for a transfer of signals from any service provisioning medium to another. While the most obvious example of such a service provisioning medium is an individual cable pair, other examples include a channel on a multiplexed signal being transmitted over a transmission medium. The arrangement can be applied to customer lines or to trunks or to media for carrying a multiplexed signal. The multiplexing can be time multiplexing, frequency multiplexing, or packetized multiplexing such as is provided by broadband networks such as SONET (Synchronous Optical Network) networks.

Figure 3:
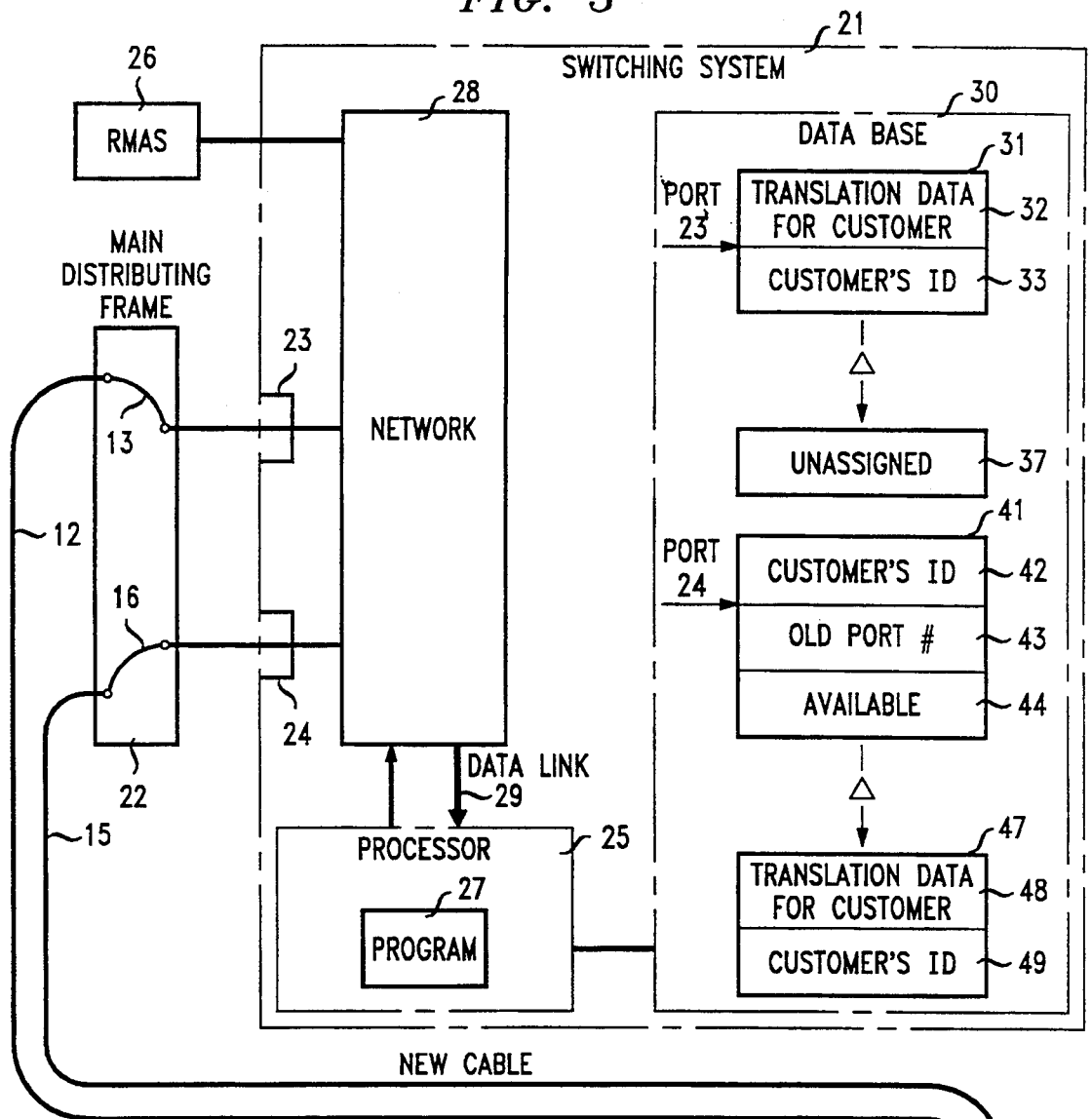
Figure 3:
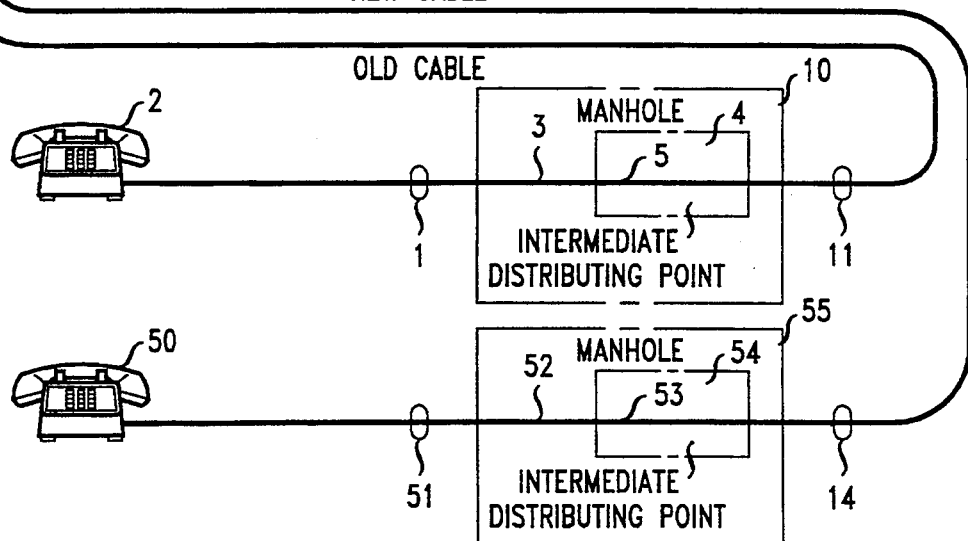

Another application (FIG. 3) of this same basic arrangement is for simplifying the move of telephone customers from one address to another if the customers are served from the same switching system. In FIG. 3, jumper 7 of FIG. 1 is replaced by jumper 53, which is placed in intermediate distributing point 54 of manhole 55 before the customer moves from telephone location 2 to telephone location 50. If the customer moves, it is very likely that his new cable will be routed through a manhole 55, different from his original manhole 10. The latter is connected to the second port 24 via cable pair 52 in cable 51, jumper 53, cable pair 15 and jumper 16.

Figure 4:
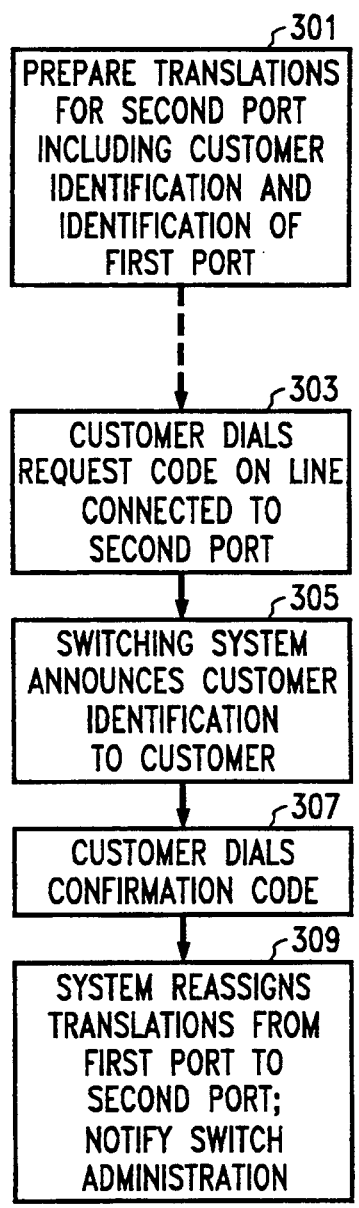
FIG. 4 is a flow diagram of steps performed in transferring a customer from one line to another line.

FIG. 4 is a flow diagram of the arrangement for performing this transfer. In one specific arrangement, the translations for the second port are prepared and include the identification of the customer being moved and the identification of the first port (action block 301). When the customer has moved, the customer dials a special request code (action block 303)s and receives the customer identification information (action block 305), by announcement or display. If this information is correct, then the customer keys or dials a confirmation code (action block 307) and, in response to the confutation code, translations for that customer are reassigned from the first port to the second port (action block 309), and the first port is made available for other uses. This includes notifying the switch administration. Clearly, numerous variations on this arrangement are available such as activation from the first line connected to the first port wherein the first port includes the identity of the second port, a single activation signal to save the customer from having to key a confirm signal under the assumption that the translation information is correct.

While in this description, craft perform the querying function and move the jumpers, it is readily apparent that the former process can be partly automated through the use, for example, of a personal computer, for automatically dialing the access codes, dialing the request to move translation data, and verifying the response signals from the switch. Connectors such as the AT&T 710 connector also make it possible to reduce the manual effort of moving jumpers by allowing this to be done on a group basis.

It is to be understood that the above description is only of one preferred embodiment of the invention. Numerous other arrangements may be devised by one skilled in the art without departing from the scope of the invention. The invention is thus limited only as defined in the accompanying claims.

We claim:

1. A method for making a transfer of a telecommunications customer station connected to a switching system, said customer station originally connected to said system via a first port of said system, by disconnecting said customer station from said first port and connecting said customer station to a second port of said switching system, said method comprising the steps of:
   entering translation data into said switching system indicating availability for assignment of said second port;
   testing whether a first means for transmission of telecommunications signals is identified by said switching a system with an identification of said customer station;
   if said first means is identified with an identification of said customer station, testing whether a second means for transmission of telecommunications signals is identified by said switching system as being connected to a port available for assignment to a customer station;
   responsive to said testing of said second means indicating availability, signaling to said switching system to assign translation data from said first port to said second port, and connecting a third means for transmission, presently connected to said first means for transmission, to said second means for transmission;
   wherein customer stations are identified by translation data of said switching system.

2. The method of claim 1 wherein data for testing availability for said second port comprises an identification of said customer station and wherein said testing of said second means for transmission comprises matching said customer station identification on said first means for transmission and on said second means for transmission.

3. The method of claim 1 wherein said signaling comprises transmitting a move translation request over one of said first and second means for transmission.

4. The method of claim 3 wherein data for testing availability comprises an identification of said first port and wherein said signaling comprises transmitting an access code over said second means for transmission to said second port.

5. The method of claim 3 further comprising the step of enhancing a translation for said first port with an identification of said second port and wherein said signaling comprises transmitting an access code over said first means for transmission.

6. The method of claim 1 wherein a plurality of ports are designated as being available for assignment to a customer station and wherein said entering step comprises:
   transmitting data for establishing said translations from an administration source; and further comprising the step of:
   following said assignment of translation data to said second port, transmitting data identifying said customer station and said second port to said administration source.

7. The method of claim 1 further comprising the step of:
   following said step of assigning said translation data to said second port, transmitting an acknowledgment signal over one of said first and said second means for transmission.

8. The method of claim 1 wherein each of said means for transmission comprises a cable pair.

9. The method of claim 8 wherein said cable pair transmits one of line signals, trunk signals, and carrier signals.

10. The method of claim 1 wherein said means for transmission comprises a channel on a multiplexed signal being carded by a transmission medium.

11. A method for moving a telecommunications customer station from a first line, said first line connected to a first port of a switching system, to a second line, said second line connected to a second port of said switching system, said method comprising the ordered steps of:
    preparing translations in said switching system for one of said first and said second ports, said preparing comprising entering translation data for identifying the other one of said first and said second ports; and
    signaling to said switching system from the one of said first and said second ports to activate translations in said switching system for said second port, said translations for said second port to enable said second port to accept communications from said station and to enable said switching system to route calls for said station to said second port;
    wherein customer stations are identified by translation data of said switching system.

12. The method of claim 11 wherein said activation comprises assigning translation data for said first port to said second port.

13. The method of claim 11 wherein said signaling is transmitted from said second line to said second port and comprises signaling an identity of said customer station and an activation code.

14. The method of claim 11 wherein said signaling is transmitted from said first line to said first port and comprises signaling an activation code.

15. The method of claim 11 wherein said signaling comprises signaling a preparation code from said second line, in response to which said switching system returns an identity of said customer station, and responsive to receiving said identity, transmitting an activation code to request the assignment of translation data from said first port to said second port.

16. Apparatus for moving telecommunications service to a customer station currently connected by a first line to a first port of a switching system to a second line connected to a second port of said switching system comprising:

processor means of said switching system, operative under program control, for storing translation data indicating availability for assignment of said second port;

said processor means further responsive to receipt of a first access code from said first port for controlling transmission of telecommunications signals for identifying said customer station;

said processor means further responsive to receipt of a second access code from said second port, for controlling transmission over said second port of data indicating availability of assignment of said second port, and said processor means further responsive to receipt of a third access code for assigning translation data of said first port to said second port;

wherein customer stations are identified by translation data of said switching system;

whereby telecommunications requests subsequently received over said second port are treated in accordance with translation data for said customer station.

17. The apparatus of claim 16 wherein said availability data for said second port comprises an identification of said customer station.

18. The apparatus of claim 17 wherein said availability data further comprises an identification of said first port and wherein said third access code is received over said second port.

19. The apparatus of claim 16 wherein translation data for said first port is augmented with an identification of said second port.

20. The apparatus of claim 19 wherein said third access code is receivable over said first port.

21. The apparatus of claim 16 wherein translation data stored for a plurality of ports indicates availability of each of said plurality of ports for assignment to a customer station, wherein said translation data indicating availability for assignment of said second port is received from an administration source, and wherein, following said assignment of translation data for said customer station to said second port, said processor means controls transmission of data identifying said customer station and said second port to said administration source.

22. The apparatus of claim 16 wherein said processor means further controls transmission of an acknowledgment signal indicating reassignment of translation data to said second port to one of said first and second ports.

23. Apparatus for moving service for a customer station currently connected by a first line to a first port to a second line connected to a second port, comprising:

processor means operative under program control for storing translation data for one of said first and second ports, said translation data comprising data for identifying the other one of said first and second ports; and said processor means further responsive to receiving an activation signal comprising an access code from said one of said first and second ports, for activating translation data for said customer station for said second port, said translation data for said second port to enable said second port to accept communications from said station and to enable said switching system to route calls for said station to said second port;

wherein customer stations are identified by translation data of said switching system.

24. The apparatus of claim 23 wherein said activation signal is transmitted over said second port and further comprises data identifying said customer station.

25. The apparatus of claim 23 wherein prior to receiving said activation signal, said processor means receives a preparation signal in response to which said processor means transmits over the port on which said preparation signal was received a signal representing an identity of said customer station.

26. The method of claim 1 wherein said means for transmission comprises a virtual channel of a packet switched facility.

* * * * *

UNITED STATES PATENT AND TRADEMARK OFFICE
CERTIFICATE OF CORRECTION

PATENT NO. : 5,361,298

DATED : November 1, 1994

INVENTOR(S) : Bernard G. Ruel, Gilbert M. Stewart, Aruna Thirunagari, James L. Turner It is certified that error appears in the above-identified patent and that said Letters Patent is hereby corrected as shown below:

Column 7, claim 1, line 33, before "system" delete "a".

Column 8, claim 10, line 27, delete "carded" and substitute --carried--.

Signed and Sealed this

Twenty-first Day of March, 1995

Attest:

BRUCE LEHMAN

Attesting Officer      Commissioner of Patents and Trademarks